Sept. 5, 1950      C. C. S. LE CLAIR      2,521,177
LIQUID OR LUBRICANT DISTRIBUTION SYSTEM Filed March 11, 1947      3 Sheets-Sheet 1

INVENTOR
CAMILLE CLARE SPRANKLING LECLAIR
By Albert G. McCaleb
HIS ATTORNEY

Sept. 5, 1950           C. C. S. LE CLAIR           2,521,177
LIQUID OR LUBRICANT DISTRIBUTION SYSTEM
Filed March 11, 1947           3 Sheets-Sheet 2

INVENTOR
CAMILLE CLARE SPRANKLING LECLAIR
BY
Albert G. McCaleb
HIS ATTORNEY

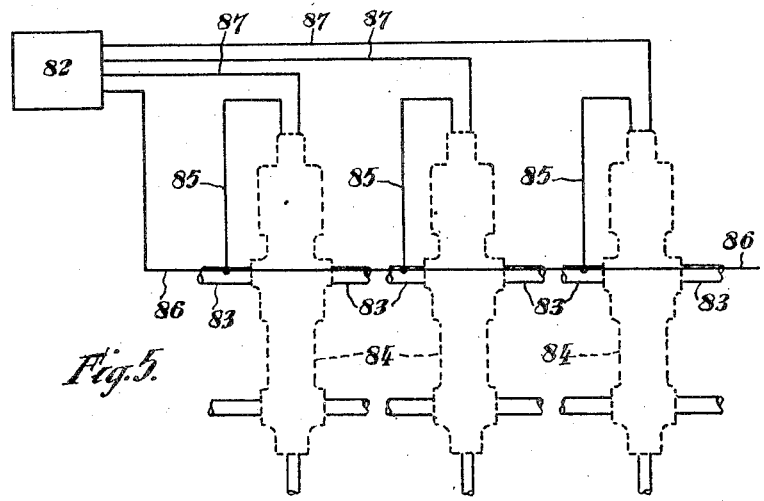
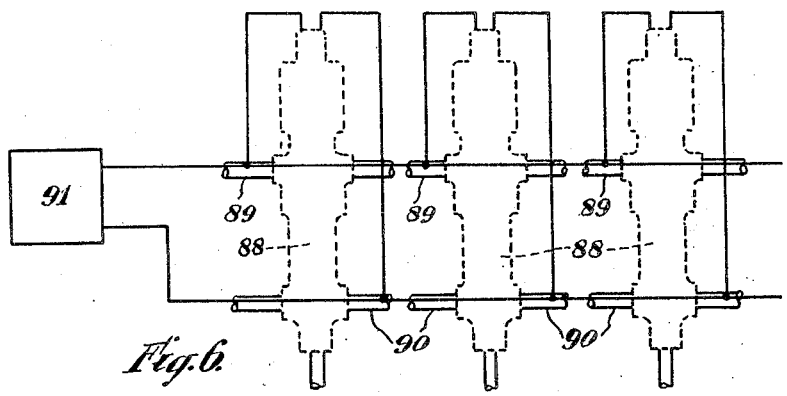
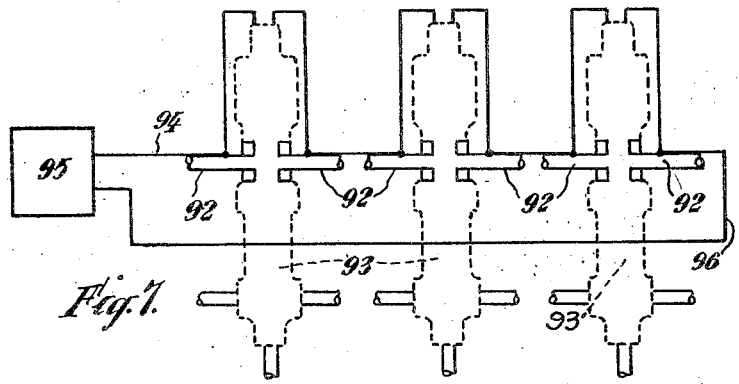

Patented Sept. 5, 1950

2,521,177

UNITED STATES PATENT OFFICE 2,521,177

LIQUID OR LUBRICANT DISTRIBUTION SYSTEM

Camille Clare Sprankling Le Clair, Acton, London, England, assignor to Tecalemit Limited, Brentford, England, a corporation of Great Britain Application March 11, 1947, Serial No. 733,819
In Great Britain April 5, 1946

4 Claims. (Cl. 184—7)

This invention relates to liquid or lubricant distributing systems, and particularly to those systems which are used for distributing lubricant to bearings or other places of use on vehicles, machines or large industrial plant lay-outs such as rolling mills and so on. For brevity, liquid and lubricant will be referred to hereinafter as "lubricant."

Lubricant systems are known which comprise lubricant metering devices adapted to be attached to the various bearings or places of use, these devices being joined together by one or more lubricant conducting conduits. In the past such devices have been operated by means of pressure variations in a single conduit which fulfils the dual function of conducting the lubricant to be distributed and, by means of pressure variations in the lubricant, conveying the energy to operate the metering or distributing devices. Similar systems are also known in which a number of conduits is used which, singly or in combination, conduct the lubricant to be distributed and also transmit the energy to operate the lubricant distributing devices.

A lubricant distributing system is also disclosed in the specification of my co-pending application No. 649,705, filed February 23, 1946, and now abandoned, in which the energy to operate the lubricant distributing devices is provided electrically; the conduit for conveying the lubricant to the devices also being adapted to conduct the electric current to operate, or control the operation of, the devices.

In all such systems, however, all the distributing devices have been both operated and controlled by a single electrical or pressure impulse emanating from a central control device in such a manner that all the devices operate simultaneously, and consequently make the same number of cycles per unit of time.

The present invention provides, in or for lubricant distributing systems for vehicles or machines or plants, a lubricant distributing device which is adapted to feed lubricant supplied to it from a source of supply to at least one place of use of the lubricant, and which comprises lubricant delivery or metering means, fluid-operated means, for actuating the lubricant delivery or metering means, and electrically-operated means for controlling the operation of the fluid operated means, the lubricant distributing device being constructed to receive lubricant through a lubricant conveying conduit and to receive pressure fluid, for actuating the said fluid-operated means, through a pressure fluid conveying conduit, the electrical energy for actuating the said electrically-operated means being conveyed through electric conductor means which are either separate from the said conduits or are incorporated in, or associated with, one or both of the said conduits.

The lubricant delivery or metering means may consist of a pump comprising a reciprocating plunger which is actuated by the said fluid-operated means and which is adapted to control the inlet of lubricant to, and the discharge of lubricant from, the lubricant distributing device.

The electrically-operated controlling means may consist of an electro-magnet having an annular solenoid and a plunger type armature slidable therein. The armature may be adapted to actuate a valve which controls the supply of pressure fluid to a cylinder containing a pump-operating piston which is connected to the pump plunger. As an alternative, however, the said valve may be adapted to control not only the supply of pressure fluid to, but also the exhaust of pressure fluid from, the said cylinder. The pressure fluid used may be compressed air.

Any number of such lubricant distributing devices may be used in a lubricant distributing system. If a number is used the lubricant supply ducts or inlets of the various lubricant distributing devices may be connected by a common conduit and the pressure fluid supply ducts or inlets may also be connected by a common conduit. Each of these conduits may be made up of lengths of flexible hose or rigid pipe. Further, one or both of the conduits may consist of dual purpose hose as described in the specification of our co-pending application No. 649,705 comprising a lubricant or pressure fluid conveying duct and also electric conductor means, and the electric conductor means of one or both of the conduits may be electrically connected to the solenoid coils of all, or each of, the devices.

On the other hand, the lubricant supply ducts or inlets and also the pressure fluid supply ducts or inlets of all the devices may be connected by a single common conduit which is formed with a lubricant-conveying duct and a separate pressure fluid conveying duct, the solenoid coils of all the individual devices being connected in an electric circuit by electric conductor means which are incorporated in the said single common conduit.

The electric circuit preferably includes a master controller, the arrangement being such that any individual lubricant distributing device can be operated separately and independently of the others by means of the electrical impulses sent out by the master controller. Various electric circuits will be described hereinafter by way of example.

Several constructional forms of the present invention are shown, by way of example, on the accompanying sheets of drawings, whereon—

Figures 1, 2:
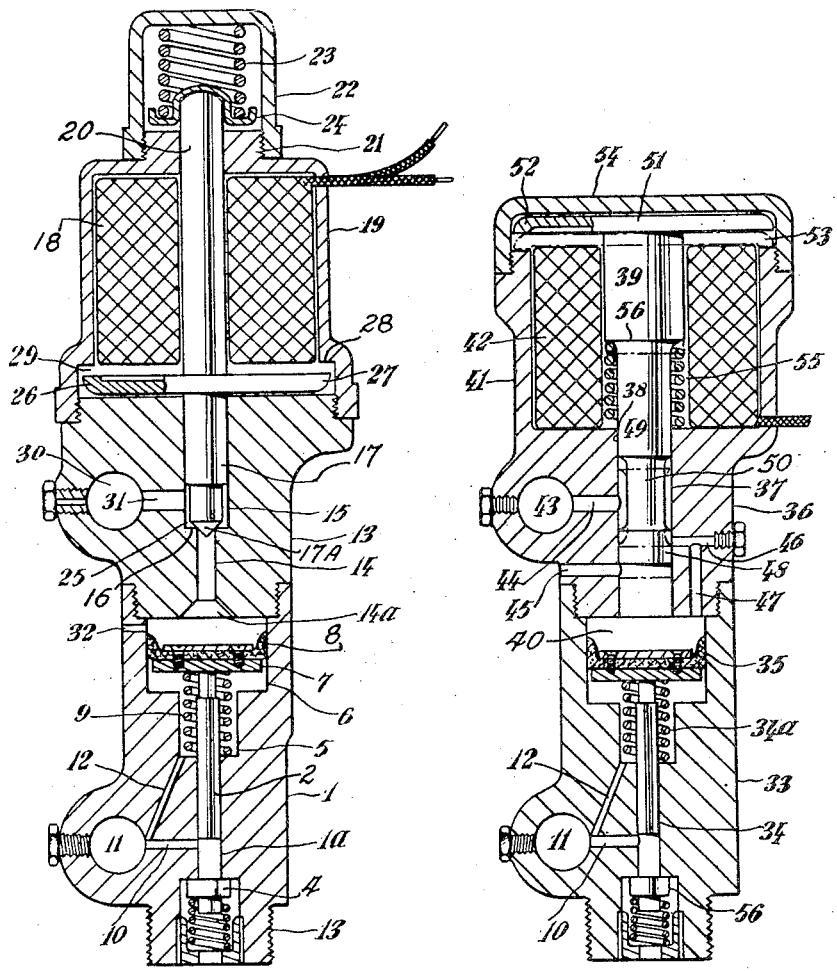
Figure 1 is a sectional elevation of one form of lubricant distributing device in which the plunger type armature is adapted to actuate a valve which controls the supply only of compressed air to a cylinder containing a pump-operating piston which is connected to the pump plunger.
Figure 2 is a sectional elevation of a modified construction in which the plunger type armature is adapted to actuate a valve which controls both the supply of compressed air to, and the exhaust of the air from, a cylinder containing a pump-operating piston which is connected to the pump plunger.
Figure 3:
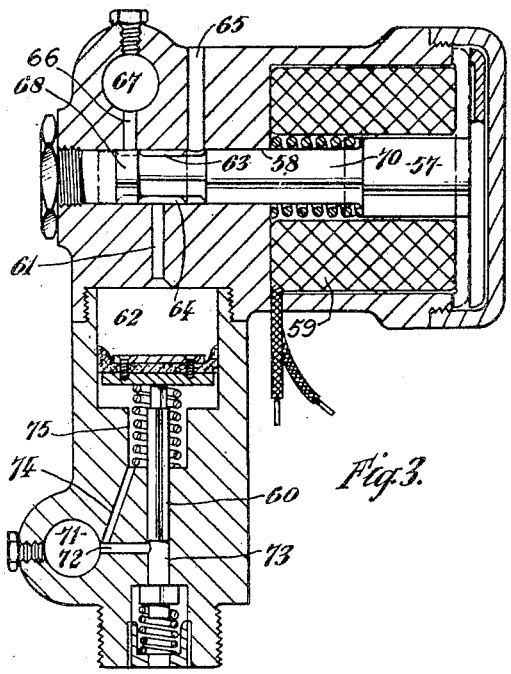

Figure 3 is a sectional elevation of an alternative construction which is similar to that shown in Figure 2, but in which the plunger type armature is arranged at right angles to the pump plunger; and Figures 4 to 7 are fragmentary diagrammatic views of lubricant distributing systems comprising lubricant distributing devices according to this invention, the figures showing different methods of connecting the solenoid coils of the devices to a master controller which is included in the electric circuit.

Referring first to Figure 1:

The lubricant distributing device includes a plunger-type reciprocating pump which comprises a body 1 bored to provide a cylinder 1A in which the plunger 2 is slidable. The lower end of the body is formed with a threaded shank 3 for attachment to a place of use of the lubricant or to a pipe leading thereto and the lower end of the cylinder bore 1A is normally closed by a spring-urged non-return discharge valve 4.

The upper end of the pump body bore is opened out into two counterbores, the lower bore 5 being somewhat larger in diameter than the cylinder bore 1A, and the upper bore 6 being larger still.

The upper end of the plunger 2 projects out of its cylinder through the lower counterbore 5 and into the upper counterbore 6. At its upper end, within the upper counterbore 6, the plunger is formed with a circular flange 7 upon which is mounted a flexible sealing disc 8 which acts as an actuating piston and is adapted to form a lubricant and fluid-tight engagement with the wall of the upper counterbore. The upper counterbore thus serves as an actuating cylinder in which the actuating piston 8 slides. The plunger is normally urged upwards by a spring 9 which reacts between the flange 7 and the bottom of the lower counterbore 5. Stop means (not shown) may be provided to limit the upward movement of the plunger.

When the plunger is in its uppermost position it uncovers a lubricant inlet port 10 which connects the plunger cylinder 1A to a transverse lubricant supply duct 11 formed in the pump body. Any lubricant that may leak into the lower counterbore 5 is drained therefrom by means of a leakage passage 12 which connects the counterbore to the inlet port 10.

A valve body 13 is attached to the upper end of the pump body 1 and is formed with a lower bore 14 comunicating at its lower flared end 14A with the actuating cylinder 6 above the actuating piston 8 and at its upper end with an enlarged bore 15, the shoulder 16 between the two bores acting as a valve seat. The lower end 17 of a plunger-type armature is slidable in the enlarged bore 15 which thus acts as a lower guide for the armature. The plunger projects upwards through the centre of an annular solenoid coil 18 which is arranged in a cup-shaped iron casing 19 attached to the top of the valve body 13. The upper end 20 of the plunger armature also projects through a boss 21 on the top of the iron casing into a cover 22 attached to the latter. The armature is normally forced downwards by a spring 23 which reacts between the top of the cover 22 and a pan 24 mounted upon the upper end of the plunger. The lower end part 17 of the plunger armature is reduced in diameter so that an annular space 25 is formed between this reduced end part and the wall of the armature guide. The extreme bottom end 17A of the armature is pointed, so that it can act as a needle valve adapted to cooperate with the valve seat 16 formed at the junction of the two bores of the valve body. The needle valve is normally pressed upon its seat by the spring 23 which forces the plunger armature downwards.

Below the bottom of the solenoid coil, the plunger armature has a large circular flange 26 with an upturned rim 27 arranged in juxtaposition with an annular shoulder 28 in the iron casing 19. An annular air gap 29 equal in width to the lift of the plunger and therefore of the valve 17A is allowed in order to permit of the necessary movement of the valve.

It will be appreciated that the armature plunger, its flange, and the sides and top of the iron casing together form a complete magnetic circuit.

The valve body 13 is provided with a pressure fluid (in this case compressed air) supply duct 30 which may be parallel to the lubricant supply duct 11 and which is in constant communication with the annular space 25 surrounding the reduced lower end part of the armature plunger through a pressure fluid inlet port 31.

As will be explained hereinafter, the lubricant supply duct 11 is connected to a source of supply of lubricant, while the pressure fluid supply duct 30 is connected to a source of compressed air. When the solenoid coil 18 is energised, the armature plunger is attracted upwards and the needle valve 17A is withdrawn from its seat 16. Compressed air from the supply duct 30 can then enter the actuating cylinder 6 above the piston 8 and the pump plunger 2 is forced downwards. On its downward stroke the plunger first closes the lubricant inlet port 10 and then forces lubricant entrapped below it in its cylinder out of the latter past the discharge valve 4 to the place of use.

When the solenoid coil is de-energised, the armature is forced downwards by its spring 23 and the needle valve end 17A of the armature plunger again engages its valve seat 16 under the action of the armature spring, the supply of compressed air to the cylinder being cut off and the pump plunger 2 being forced upwards again by its own spring 9. On its upward stroke the pump plunger again uncovers the lubricant inlet port 10, whereupon a fresh supply of lubricant from the lubricant supply duct 11 enters the pump cylinder 1A below the plunger.

A small bore port 32 is drilled through the wall of the pump body into the actuating cylinder 6 above the actuating piston 8 to permit compressed air to escape from the cylinder above the piston after the armature needle valve 17A has been seated. The port 32 is so small that the amount of air entering the actuating cylinder through the bore 14 of the valve body is greatly in excess of that which can escape, so that pressure is built up in the actuating cylinder 6 and the pump plunger 2 is operated as previously described.

The permanently-open air leakage port 32 obviously entails a loss of pressure air but it has the advantage that a simple type of air control valve having a single seat can be used. If, however, the loss of air should not be permissible the following alternative constructions may be used.

Referring to Figure 2:

In the first of these alternative constructions, the pump body 33, the pump plunger 34 and the actuating piston 35 are all constructed as previously described. The valve body 36, however, has a parallel bore 37 in place of the stepped bore of the construction shown in Figure 1 and within the bore is slidably arranged a piston valve 38 which forms part of, or is attached to, the armature plunger 39. The lower end of the bore 37 communicates with the actuating cylinder 40 while its upper end communicates with the interior of a housing 41 in which the annular solenoid coil 42 is arranged.

The compressed air supply duct 43 communicates with the parallel bore 37 through an air inlet port 44 while an air exhaust port 45 located below the inlet port provides communication between the bore and atmosphere. A partly horizontal and partly vertical transfer port 46, 47 provides communication between the parallel bore 37 at a point between the air inlet and exhaust ports 44 and 45 and the actuating cylinder 40.

The piston valve which is used to control the supply of compressed air to, and the exhaust of the air from, the actuating cylinder, comprises a lower piston part 48 which is slidably guided in the lower end of the parallel bore, an upper piston part 49 which is slidable in the upper end of said bore, and an intermediate part 50 of reduced diameter between the said two piston parts.

The armature plunger 39 projects upwards out of the parallel bore 37 through the central hole in the annular solenoid coil 42 and out the top of the coil where at its upper end it is formed with a large circular flange 51 with a downturned rim 52 arranged in juxtaposition with the top edge of the housing 41, an air gap 53, which is located in a space above the top of the coil 42 being allowed as in the construction shown in Figure 1. The top end of the housing above the flange is closed with a non-ferrous cover 54. The integral slide valve and armature plunger are pressed upwards by a coil spring 55 accomodated within the solenoid and reacting between the bottom of the housing and a shoulder 56 on the armature plunger.

When the lubricant distributing means is inoperative, the circular flange 51 is held in contact with the non-ferrous cover 54 by the spring 55. In this position, the annular space surrounding the reduced part 50 of the piston valve is in communication with the compressed air supply duct 43, through the air inlet port 44, the interior of the actuating cylinder 40 is in communication with the atmosphere through the air exhaust port 45 and the transfer port 46, 47 is masked by the lower piston part 48 of the piston valve.

When the solenoid coil 42 is energised the integral armature plunger and the piston valve are pulled downwards into such a position that the lower piston part 48 of the piston valve uncovers the horizontal transfer port 46 and masks the air exhaust port 45. In these circumstances, air from the air supply duct 43 can enter the actuating cylinder 40 through the annular space surrounding the reduced part 50 of the piston valve and the horizontal and vertical transfer ports 46 and 47. The pump plunger 34 then carries out its downward discharge stroke as previously described, and ejects lubricant past the discharge valve 56 out of the valve body.

When the solenoid coil is de-energised, the integral armature plunger and piston valve are moved upwards by their spring 55. The horizontal transfer port 46 is again closed and the air exhaust port 45 is again uncovered so that the air can exhaust from the actuating cylinder 40. The pump plunger 34 then returns to its uppermost position under the influence of its spring 34A.

Referring now to Figure 3:

In the second alternative construction referred to above, the integral armature plunger 57 and piston valve 58 and the solenoid coil 59 are arranged horizontally with their common axis at right angles to the axis of the pump plunger 60. This construction has the advantage that the partly horizontal and partly vertical air transfer port 46, 47 shown in Figure 2 is replaced by a single straight port 61 which provides communication between the actuating cylinder 62 and the annular space 63 surrounding the reduced part 64 of the piston valve.

When the device is inoperative, the interior of the actuating cylinder 62 communicates with atmosphere through the transfer port 61, the said annular space 63 and an air exhaust port 65, and the air inlet port 66 leading to the air inlet duct 67 is masked by the end 68 of the piston valve remote from the armature plunger 57. When the coil 69 is energised, however, the integral armature plunger and piston valve are pulled into such a position that the interior of the actuating cylinder 62 is put into communication with the compressed air supply duct 67 through the transfer port 61, the said annular space 63 and the air inlet port 66, which latter is then unmasked, while the exhaust port 65 is masked by the part 70 of the piston valve shutting off communication with the atmosphere. As in the constructions described above, the lubricant supply duct 71 is connected by an inlet port 72 to the plunger cylinder 73 and by a leakage port 74 to the spring chamber 75 below the actuating cylinder 62.

It will be obvious that a lubrication distributing system may comprise one or more lubricant distributing devices provided by this invention.

Figure 4:
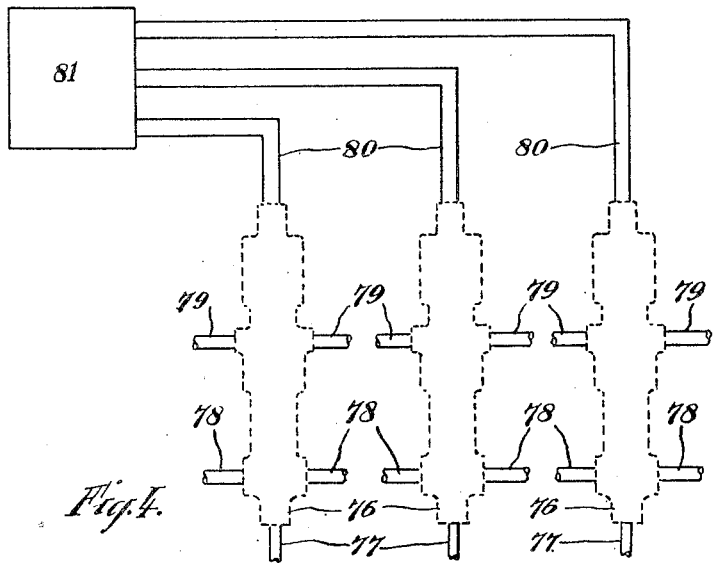

Thus, referring to Figure 4, in the case of a lubrication system for use on vehicles or machines and comprising a number of lubricant distributing devices 76 of the first constructional form described above with reference to Figure 1, the outlet 77 of each of the devices is connected to one or more places of use of the lubricant. The lubricant supply ducts 11 of all the devices are connected in series and to a source of supply of lubricant, by a common conduit, including lengths 78 of flexible hose or rigid pipes by which the said ducts are connected. The compressed air supply ducts 30 of all the devices are also connected to each other in series and to a source of compressed air by a separate common conduit again including lengths 79 of flexible hose or rigid pipes.

The solenoid coils 26 of all the devices are connected by leads 80 to a source of supply of electrical energy (not shown) through a master controller 81, the arrangement of which may be such that any individual device may be operated separately and independently of the others. Thus, one device could be operated once per minute, another twice per minute and so on. Further, the timing of any one device could be changed without changing the others, so that complete control of the system is possible.

A master controller for this purpose may comprise a reduction gear box which takes its motion from some moving part of the vehicle or machine in similar fashion, for example, to a speedometer or revolution counter. This reducing gear drives a cam shaft, which can be incorporated within its own casing, the cams of which are adapted to make intermittent contacts so as to send out electrical impulses at predetermined intervals. Alternatively, the master controller may take its motion from a clock or similar timing device.

Either the said common conduit 78 or 79 for conveying lubricant to the devices or for conveying the compressed air thereto conveniently consists of a dual conveying means such as described in the specification of our said co-pending patent application No. 649,705, that is to say, a dual purpose conduit which may be used for conveying either the lubricant or the compressed air to be supplied to the various lubricant distributing devices in the system and electric conductor means for conveying the electrical energy to the solenoid coils of the devices. Means, such as described in the said specification may be provided for attaching the lengths of dual purpose hose to the distributing device bodies and for insulating the electric conductor means from the bodies.

Referring to Figure 5, for example, in one such arrangement, the system includes a master controller 82 such as described above and the interconnected electric conductor means of the lengths 83 of dual purpose hose which serve as a common conduit for conveying the compressed air to the adjacent distributing devices 84 and for conveying electrical energy to the solenoids through their electrical conductors. The latter are connected to the controller, and form a common negative return 86 to which the solenoid coils of all the separate lubricant distributing devices are connected through the individual connections 85 from the latter. The controller is adapted to cause electrical impulses so be transmitted to the solenoid coils through separate positive leads 87 connecting the positive sides of the coils to the controller.

In this construction, the individual solenoids can be separately and individually controlled, thus providing complete control to meet the needs of any given set of circumstances.

In an alternative and less comprehensive system shown in Figure 6, all the lubricant distributing devices 88 are operated in unison. In this case, both comon conduits 89 and 90 may consist of the said dual purpose hose, the electric conductor means of one hose then connecting a master controller 91 to the positive sides of all the solenoids and the electric conductor means of the other dual purpose hose connecting the negative sides of the solenoid coils back to the master controller so that all the solenoids are connected in parallel.

Referring to Figure 7, in a modification of the above system, the pressure fluid supply ducts or the lubricant supply ducts of all the devices may be connected by a dual purpose hose, the electric conductor means of which is insulated from the valve bodies. Actually, the figure shows the pressure fluid supply ducts connected by the dual purpose hose 92. The solenoid coils are connected in series, the coil of the first device 93 in the circuit being connected by a lead 94 to a master controller 95 and the coil of the last device 93 in the circuit being connected to a return lead 96 which is also connected back to the controller. The lubricant supply ducts (or the pressure fluid supply ducts, as the case may be) which are not connected by the dual purpose hose as described above, may be connected by ordinary flexible hose or rigid pipe. On the other hand if a dual purpose hose were used for this purpose the return lead 96 might be connected back to the controller via the conductor means of the said hose.

It will be appreciated that in any one vehicle, machine or installation, there may be two or more lubricant distributing systems of any of the kinds described above, operated in parallel from one master controller, one lubricant supply source and one pressure fluid source.

The plunger pumps of the lubricant distributing devices described above are of the same type as those described in the specification of our prior applications Nos. 600,158 and 600,159, now abandoned. It will be understood, however, that other types of reciprocating pumps could be used, such, for example, as the opposed piston and plunger pumps described in the specification of our said pending application No. 649,705, now abandoned.

I claim:

1. In a lubricant distributing system, a lubricant distributing device comprising a pump body, a lubricant chamber therein, a plunger reciprocable in said chamber, a lubricant inlet to said chamber, said plunger acting to open said inlet near the end of its suction stroke and to close said inlet near the commencement of its discharge stroke, means connecting said inlet to a source of lubricant, a lubricant outlet from said chamber, means connecting said outlet to a place of use of the lubricant, a pressure fluid cylinder in said body, a pressure-fluid operated piston reciprocable in said last mentioned cylinder and operatively connected to said plunger to operate the latter on its discharge stroke and spring means to operate it on its suction stroke, an inlet to said pressure fluid cylinder, an outlet from said cylinder, a pressure fluid inlet in said body, said inlet being connected to a source of supply of pressure fluid, a cylindrical valve chest in said body in communication with the pressure fluid inlet and said inlet in the pressure fluid cylinder, a pressure fluid control valve slidable in said chest to establish and to cut off communication between said pressure fluid inlet in said body and said inlet to said pressure fluid cylinder, and means electrically operated in one direction and spring operated in the other direction and directly connected to said control valve for actuating the valve in said one direction, so that when said electrically operated means is energized said control valve opens communication between said pressure fluid inlet in said body and said inlet to said pressure fluid cylinder to effect a discharge stroke of said plunger, whereas when said electrically operated means is de-energized the control valve under the urge of its spring means moves to cut off communication between said pressure fluid inlet to said body and said pressure fluid inlet to said fluid pressure cylinder permitting said pressure fluid-operated piston to return under the urge of its spring means, thus causing said pump plunger operatively connected to the piston to effect a suction stroke thereof and ultimately opening said lubricant inlet to the pump chamber.

2. A lubricant distributing device as claimed in claim 1, wherein the said electrically-operated means consist of an electro-magnet having a solenoid and a plunger type armature slidable therein.

3. A lubricant distributing system, comprising a plurality of lubricant distributing devices as defined in claim 1, and wherein the lubricant supply ducts or inlets of all the individual devices are connected by a common lubricant-conveying conduit connected to a source of supply of lubricant and the pressure fluid supply ducts are connected by a common pressure-conveying conduit connected to a source of supply of pressure fluid, and wherein the said electrically-operated means, of all the individual devices are connected in an electric circuit by electric conductor means which are associated with one of the said common conduits.

4. A lubricant distributing system as claimed in claim 3, and wherein the said electric conductor means are incorporated in the said common conduits.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 1,678,347 | McClure | July 24, 1928 |
| 1,914,900 | Tarbox | June 20, 1933 |
| 1,931,894 | Gill | Oct. 24, 1933 |
| 2,035,157 | Hallerberg | Mar. 24, 1936 |
| 2,164,273 | Hodson | June 27, 1939 |